US011230051B2

(12) United States Patent
Edelhäuser et al.

(10) Patent No.: US 11,230,051 B2
(45) Date of Patent: Jan. 25, 2022

(54) HOMOGENIZATION OF THE ENERGY INPUT (71) Applicant: EOS GmbH Electro Optical Systems, Krailling (DE)

(72) Inventors: Sebastian Edelhäuser, Zorneding (DE); Ludger Hümmeler, Gauting (DE); Peter Hofbauer, Munich (DE); Christopher Schmitt, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 206 days.

(21) Appl. No.: 16/499,701

(22) PCT Filed: Apr. 24, 2018

(86) PCT No.: PCT/EP2018/060398
§ 371 (c)(1),
(2) Date: Sep. 30, 2019

(87) PCT Pub. No.: WO2018/197443
PCT Pub. Date: Nov. 1, 2018

(65) Prior Publication Data
US 2020/0023578 A1    Jan. 23, 2020

(30) Foreign Application Priority Data
Apr. 28, 2017   (DE) .......................... 102017207264.4

(51) Int. Cl.
*B29C 64/153*    (2017.01)
*B22F 10/20*     (2021.01)
B33Y 50/02      (2015.01)
B29C 64/386     (2017.01)
B29C 67/04      (2017.01)
B22F 10/30      (2021.01)

(52) U.S. Cl.
CPC ............ *B29C 64/153* (2017.08); *B22F 10/20* (2021.01); *B22F 10/30* (2021.01); *B29C 64/386* (2017.08); *B29C 67/04* (2013.01); *B33Y 50/02* (2014.12)

(58) Field of Classification Search
CPC .................................................. B29C 64/153
See application file for complete search history.

(56) References Cited

U.S. PATENT DOCUMENTS

| 5,904,890 A | 5/1999 | Lohner et al. |
|---|---|---|
| 2006/0119012 A1 | 6/2006 | Ruatta et al. |
| 2012/0211926 A1 | 8/2012 | Larsson et al. |
| 2017/0151722 A1 | 6/2017 | Prasad et al. |

FOREIGN PATENT DOCUMENTS

| CN | 105538712 A | 5/2016 |
|---|---|---|
| CN | 106232331 A | 12/2016 |
| CN | 106584832 A | 4/2017 |
| DE | 19606128 | 8/1997 |
| DE | 10042134 | 3/2002 |
| DE | 102015216583 A1 | 3/2017 |
| WO | 2015091875 | 6/2015 |

OTHER PUBLICATIONS

Ho Yeung et al.: "Laser Path Planning and Power Control Strategies for Powder Bed Fusion Systems" Proc. of the 27th Annual International Solid Freeform Fabrication Symposium, Aug. 1, 2016, XP055492295, 16 pages.
International Search Report for Application No. PCT/EP2018/060398 dated Jul. 25, 2018, 6 pages.

*Primary Examiner* — Larry W Thrower
(74) *Attorney, Agent, or Firm* — Seyfarth Shaw LLP (57) ABSTRACT A method for providing control data for a generative layer construction device has a first step of accessing a data record which, at least for a partial region of an object cross section, specifies in which temporal sequence an energy beam bundle is to be moved in scanning lines over the places of this partial region to scan the buildup material. In a second step, the data record is changed such that in at least one of the layers for the respective partial region of an object cross-section, a check is carried out to determine whether the scan time required to scan the buildup material along a scanning line falls below a predefined minimum duration tmin and either a lower energy density of the energy beam bundle during scanning of the buildup material along this scanning line is specified and/or a wait time is specified before the energy beam bundle is moved along a further scanning line.

10 Claims, 6 Drawing Sheets

HOMOGENIZATION OF THE ENERGY INPUT

TECHNICAL FIELD OF THE INVENTION

The invention refers to a method and a device of providing control data for a layer-wise additive device, a respectively adapted layer-wise additive manufacturing method, a respectively adapted layer-wise additive manufacturing apparatus, a respectively adapted computer program and a computer-readable storage medium on which the computer program is stored.

BACKGROUND OF THE INVENTION

Layer-wise additive manufacturing apparatus and corresponding methods are generally characterized in that objects are manufactured in them layer by layer by means of a solidification of a shapeless building material. For example, the solidification can be effected by means of a supply of heat energy to the building material by irradiating the same with electromagnetic radiation or particle radiation (e.g. laser sintering (SLS) or laser melting or electron beam melting) or else by effecting a cross-linking reaction in the building material (e.g. stereolithography). The devices and methods that were originally used in prototyping more and more are used for a series production, for which the term "additive manufacturing" has become common.

In order to be able to manufacture objects with high precision by means of a layer-wise additive manufacturing method, it is important that the building material within each of the layers is solidified as uniformly as possible. This problem is addressed by WO 2015/091875 A1 on the field of electron beam melting. In particular, it refers to the scanning of an object cross-section with the electron beam in scan lines running in parallel to each other. By this way of scanning the building material within the object cross-section, the object cross-section is moved across the building material similarly to a hatching of an area, so that this way of directing the electron beam onto the building material is also named "hatching" in technical jargon.

In WO 2015/091875 A1 it is stated that the amount of energy supplied to the material depends on whether the scanlines are long or short. For long scanlines it is observed that an amount of energy that is supplied is too small while for short scanlines it is observed that an amount of energy that is supplied is too high. In order to solve the problem, WO 2015/091875 A1 suggests determining the scanning time for the material along the longest scanline occurring in the hatching of the object cross-section and inserting a waiting time for all shorter scanlines before or after the scanning of the scanline so that the sum of the scanning time of a scanline and of the waiting time always corresponds to the scanning time for the longest scanline.

The approach according to WO 2015/091875 A1 is suitable for providing for a more uniform melting behavior in electron beam melting. However, a disadvantage of this procedure is that by the insertion of waiting times the production process is prolonged, which is disadvantageous in particular on the field of "additive manufacturing" as there larger quantities shall be manufactured within a manufacturing time as short as possible.

SUMMARY OF THE INVENTION

In view of the above-described problem, it is an object of the present invention to provide a method and a device by which objects can be manufactured by means of a layer-wise additive manufacturing method, in particular an "additive manufacturing" method, with high quality within a short time.

The object is achieved by means of a computer-based method according to claim 1, a layer-wise additive manufacturing method according to claim 9, a device according to claim 10, a layer-wise additive manufacturing apparatus according to claim 12, a computer program according to claim 13 and a computer-readable storage medium according to claim 14. Further developments of the invention are claimed in the dependent claims. In particular, a device according to the invention can be developed further also by features of the method according to the invention characterized further below and by features characterized in the dependent claims, respectively, and vice-versa. Moreover, the features described in connection with one device according to the invention may also be used for a further development of another device according to the invention, even if this is not explicitly stated.

An inventive computer-based method of providing control data for a layer-wise additive manufacturing apparatus for manufacturing a three-dimensional object, wherein the object is manufactured by means of the layer-wise additive manufacturing apparatus by applying a building material layer by layer and by solidifying the building material by a supply of radiation energy to all positions in a layer that correspond to the cross-section of the object in this layer in that these positions are scanned with energetic radiation by means of an energy input device such that the energy input device directs at least one energy beam to predetermined positions of a building material layer so that the energy beam effects a solidification of the building material, comprises a first step S1 of accessing a dataset that includes a data model of a number of building material layers to be selectively solidified during the manufacture, wherein in each of the layers of the data model positions corresponding to an object cross-section are marked, at which positions a solidification of the building material shall be carried out (as far as intended or existing in this layer), wherein in the dataset in at least one layer, preferably all layers, of the data model it is specified at least for a partial region of an object cross section in which chronological order an energy beam is to be moved in, preferably parallel, scan lines across the positions of this partial region for a scanning of the building material.

The method is characterised in that in a second step S2 the dataset is modified such that in at least one layer, preferably all layers, of the data model for the respective partial region of an object cross section it is checked whether the scanning time needed for the scanning of the building material along a scan line falls below a predetermined minimum length of time $t_{min}$ and if this is detected for a scan line, a reduced energy density of the energy beam during the scanning of the building material along this scan line is specified and/or after the scanning along the scan line a waiting time is specified before the energy beam is moved along a further scan line, wherein the reduced energy density of the energy beam is specified such that the more the predetermined minimum length of time $t_{min}$ is underrun, the lower the energy density of the energy beam that is specified, and in a third step S3 the dataset that was modified in the second step is provided for the generation of a control dataset for the layer-wise additive manufacturing apparatus.

Layer-wise additive manufacturing apparatus and methods to which the present invention refers, are in particular those, in which energy is selectively applied to a building material layer as electromagnetic radiation or particle radiation in order to heat the building material. For this, the energy input device may for example comprise a laser or an electron beam source. Here, the building material is partially or completely melted by the energy input by the radiation, whereby the constituents of the building material (for example powder grains) coalesce. Then, after having cooled down, the building material exists as a solid state body. As the transition from a superficial melting (sintering) to a complete melting (melting) is smooth, the terms "sintering" and "melting" are synonymously used in the present application and no difference is made between sintering and melting.

Different materials may be used as building material in a layer-wise additive manufacturing method according to the invention, preferably powders or pastes and gels, respectively, in particular metal powders, but also plastic powders, ceramic powders or sand, where also the use of filled or mixed powders is possible.

The term "beam" shall express that not only rays are included which have a small cross-section when incident on the building material, but also rays that have e.g. a linear cross-section or even radiation that is simultaneously input into a larger area of the building material (meaning areally). In each case, however in particular if the energy input is areal, an energy density specified for the respective energy beam always refers to the energy density averaged over the area of incidence. Furthermore, it does not play any role for the present invention, whether the energy input device is able to direct one or several energy beams after one another or simultaneously at the building material, as long as neighboring scanlines are scanned subsequently in time. However, the present invention can in particular be advantageously applied, if only one energy beam is present.

Here, it shall be remarked that by means of a layer-wise additive manufacturing apparatus according to the invention not only one object, but a plurality of objects may be manufactured at the same time. If in the present application the manufacturing of one object is mentioned, it is self-evident that the respective description may be applied in the same way also to layer-wise additive manufacturing apparatus and methods in which a plurality of objects are manufactured at the same time. Moreover, it shall be remarked here that in the present application the term "number" always is understood to have the meaning "one or a plurality of".

Here, a control dataset (often also termed "control command set") is regarded as sequence of instructions to apply layers of the building material subsequently and to irradiate regions of the respective layers that correspond to the cross-section of an object to be manufactured with energetic radiation in order to solidify the building material.

Specifically, a control dataset is based on a computer-based model of the object(s) to be manufactured, preferably a CAD volume model. The control dataset defines for each building material layer in the manufacture those positions at which a solidification of the building material shall be effected by the supply of radiation. Furthermore, a control dataset often also specifies the thickness of the applied layer and moreover often also contains manufacturing specific information, for example with regard to the position and orientation of the objects in the layer-wise additive manufacturing apparatus or with regard to a diameter of the energy beam when it impinges on the building material. Usually, the control dataset contains all data that are necessary for a control of the energy input device, whereby the energy density of the energetic radiation and, if necessary, the velocity of movement of the beam across the building material are defined.

Thus, the control command set can be regarded as total number of control data that are predetermined for the control of the manufacturing process in a layer-wise additive manufacturing apparatus. The control dataset may, however, also comprise at least a portion of this total number. Here, the control data related to a single layer are also designated as layer dataset. Thus, a layer dataset is a dataset that contains a data model of a building material layer which is to be solidified at the positions of an object cross-section during the manufacturing process. Such a layer dataset usually is obtained by a segmentation of a CAD volume model of the object to be manufactured into layers (in technical jargon termed "slicing"). However, it is also conceivable that a two-dimensional representation of an object cross-section that is to be solidified in a layer by means of one or a plurality of beams is extracted from the computer-based CAD model of the object in a different way. Still further information with respect to the manufacturing of the object cross-section, e.g. the layer thickness, the diameter of a beam impinging on the building material, etc., may be contained, but need not be contained, in the layer dataset.

When it is referred to an access to a dataset, this means that the dataset is read from a memory or else that the data corresponding to the dataset are received via a network. Here, the data models of a plurality of building material layers to be selectively solidified during the manufacturing, need not necessarily be read together (meaning simultaneously). It is also possible that there is a larger time lag between the access processes to the data models of different layers, for example when during a manufacturing process of an object the data model of a building material layer (a layer dataset) in each case is read when it is needed and a modified dataset for the building material layer is integrated into the control dataset during the manufacturing process.

Datasets that have been modified according to the second step need not be supplied individually to a layer-wise additive manufacturing process. Rather, at first, several modified datasets may be collected and then can be provided in total for being integrated into a control dataset.

By the approach according to the invention it is possible to make the energy input into a building material layer more uniform without being forced to introduce waiting times that prolong the manufacturing process disadvantageously as at any one time there is a waiting for a certain amount of time (the waiting time) before the chronologically next scanline is scanned. In particular, according to the invention, the energy density of the energy beam used for the scanning is lowered only when a predetermined minimum length of time for the scanning of a scanline is underrun. The inventors have the experience that above of a certain length of the scanlines and above of a certain minimum length of time for the scanning of a scanline, respectively, effects of the amount of energy input into the material in this scanline on the melting behavior when scanning a neighboring scanline can be neglected. If waiting times are inserted only when a minimum length of time for the scanning of a scanline is underrun, this reduces the manufacturing time as waiting times have to be inserted only in regions with short scanlines. In particular, it is possible to completely avoid waiting times, when the energy density of the energy beam is reduced. According to the invention, a "reduced energy density" always is an energy density (energy per unit area) that has a lower value than an energy density of an energy beam which is moved along a scanline such that the length of time needed therefore (the scanning time tA) is larger or the same than the predetermined minimum length of time. For example, the energy density for scanning times that are larger than the minimum length of time can be set to always correspond to at least a certain standard energy density EN.

Here, it shall also be emphasized that according to the invention it is the energy density of the energy beam that is lowered and that the heat input is not lowered, for example, only by a faster movement of the energy beam along a scanline. The inventors have found that for a faster movement of the energy beam the heat supply into the building material should be theoretically lower, however, that the faster movement of the energy beam has the effect that the energy beam arrives within a shorter time again at a position to be solidified near a position solidified shortly before. Thus, by the faster movement of the energy beam in no way a more uniform melting of the building material is effected.

Preferably, in the second step it is checked, whether for two scan lines lying next to each other the predetermined minimum length of time train is underrun by a different amount and if this is the case it is checked which of the two scan lines is to be scanned later in time, wherein a first reduced energy density E1 is specified for the scan line to be scanned first and a second reduced energy density E2 is specified for the scan line to be scanned later in time, wherein the first and second reduced energy densities E1 and E2 are specified such that for the case that a scanning time $t_{A2}$ for the scan line to be scanned later in time is smaller than a scanning time $t_{A1}$ for the scan line to be scanned first the absolute value of the difference between the first and second reduced energy densities |E1−E2| is smaller than in the case in which a scanning time $t_{A2}$ for the scan line to be scanned later in time is larger than a scanning time $t_{A1}$ for the scan line to be scanned first.

The inventors have found that an even more uniform solidification of the building material may be achieved, if it is taken into consideration, whether the length of time needed for the scanning of the scanlines is increasing or decreasing. If the length of time for the scanning of the following scanline increases by a certain amount with respect to the preceding neighboring scanline, the energy density of the energy beam will be increased to a larger extent than for a lowering of the energy density in a case in which the length of time needed for the following scanline has decreased with respect to the neighboring scanline by the same amount. The inventors explain the resulting positive effect on the homogeneity by the fact that when the length of time for the scanning is lowered, the energy stored in the already solidified region can be utilized, whereas when the length of time for the scanning is increased, more material has to be brought to a higher temperature. It shall be remarked that often, in particular for a constant scanning velocity, a larger length of time for the scanning is equivalent to an increase of the length of the scanlines.

In particular, the invention may be advantageously applied, when locally neighboring scanlines are scanned consecutively in time, independent from the number of energy beams that is used.

Further preferably, the provided dataset includes a plurality of partial regions of a cross section in a layer, which partial regions are located above unsolidified material in the preceding layer or below material in the following layer that is not to be solidified.

The inventors have the experience that in an object cross-section to be solidified an adjustment of the energy input for achieving a good surface quality is difficult, particularly in bottom surface regions, meaning regions which lie above of building material that remains unsolidified during the manufacturing of the object, and in top surface regions meaning regions of an object cross-section which immediately after the manufacturing of the object are covered by building material that remained unsolidified. The reason is the differing heat conductivity of the unsolidified building material in the underlying layer and the overlying layer, respectively. Here, the specifications for the direction "under" and "over" refer to a direction perpendicular to the layer planes. In this respect it is assumed that underlying layers are applied prior to overlying layers and therefore are arranged below the overlying layers.

By the use of the invention particularly in bottom surface regions and top surface regions it becomes possible to provide for a good quality particularly in these delicate regions.

In a further preferred implementation of the inventive method, for the case that an underrun of the minimum length of time $t_{min}$ is detected for a scan line, a waiting time is inserted before or after the scanning of the building material along this scan line, wherein the waiting time corresponds at most, preferably exactly, to the difference between the minimum length of time $t_{min}$ and the length of time for the scanning of this scan line.

By adapting the respective waiting times to the scanning times for the scanlines, for regions of an object cross-section in which the length of time for the scanning of the scanlines is smaller than a minimum length of time due to the small size of the region a very uniform solidification of the building material may be nevertheless achieved.

In a further preferred implementation of the inventive method, n exposure regions are assigned to the at least one partial region, wherein n is a natural number, an exposure region being a rectangular or quadratic area element that partially overlaps the partial region, wherein in an exposure region an energy beam is moved across the building material in the partial region in, preferably parallel, scan lines, when the building material is scanned with energetic radiation.

By the segmentation of a partial region of an object cross-section or of the total object cross-section except the contour line into exposure regions, it is possible to provide for a more uniform solidification as, in particular in large-area object cross-sections, by the solidification of the building material exposure region by exposure region it can be avoided that the building material in the neighborhood of an already solidified position cools down too much. Preferably, the exposure regions are rectangular or quadratic area elements that preferable have the same size, so that a tessellation-like cover of (a partial region of) an object cross-section is possible in a simple way. Here, the term "to cover partially" means that an exposure region does not completely cover the partial region of the object cross-section (or the total object cross-section). Preferably, the scanlines within an exposure region run substantially in parallel to one another, though these need not necessarily be so.

Due to the assignment of exposure regions, the building material inside of an exposure region may be scanned with scanlines having the same length, wherein for example the scanlines all are aligned in parallel to a side of a rectangular exposure region. For the case that the size of an object portion is smaller than the resulting constant length of the scanlines, this portion has of course to be scanned with shorter scanlines in order to solidify the building material in this portion. Nevertheless, the approach according to the invention provides for a uniform energy input in this portion in that for example the minimum length of time for the scanning of a scanline is set to the length of time for the scanning along a scanline in the exposure region, which runs in parallel to a side of the exposure region and extends over the total length of this side.

In a modification of the just-described further preferred implementation of the inventive method, for the case that for a scan line an underrun of the minimum length of time $t_{min}$ is detected, a waiting time before or after the scanning of the building material along this scan line is specified and a scanning of the building material by the energy beam along at least one further scan line is specified for the waiting time.

Even if a waiting time is inserted before or after the scanning of the building material along a scanline, this waiting time can be used for scanning the building material at another position to be solidified in that for example the building material is scanned along another scanline during the waiting time, in particular in another partial region of an object cross-section. Though waiting times are inserted, the length of time needed for the manufacturing of an object can thereby be kept short.

In a further modification, the minimum length of time $t_{min}$ is set to the quotient of the extent (w) of the exposure region in a direction which is in parallel to the scan lines and the mean velocity (v) of movement of the energy beam along a scan line in the exposure region, so that an underrun of the minimum length of time $t_{min}$ is indicated by the length of a scan line (h) being smaller than the extent (w) of the exposure region in a direction which is in parallel to the scan lines.

In this way, the minimum length of time can be predefined in a simple way, as the mean velocity of movement of an energy beam along a scanline in the exposure region can be determined, so that in particular for a constant velocity of movement, the minimum length of time results in a simple way from the geometric dimension of the exposure region in parallel to the scanlines.

In particular, the reduced energy density of the energy beam ($E_{reduc}$) along a scan line is defined according to the equation $$E_{reduc} = E_0 - (1 - f(h) * h/w) * a * E_0,$$

wherein $E_0$ is the mean energy density of the energy beam at positions of the partial region at which the minimum length of time $t_{min}$ is not underrun when scanning along the scan lines, wherein h is the length of a scan line in a partial region, wherein f(h) is a function describing the monotonic decrease of the energy density with decreasing length of a scan line, wherein w is the size of the exposure region in the direction of the scan lines and wherein a describes the maximum amount by which the energy density of the energy beam shall be decreased.

By the specified equation, the preferred energy to be input at a position of the building material when scanning along scanlines can be calculated in a simple way already before the manufacturing process of an object by means of a layer-wise additive manufacturing apparatus. Here, it shall also be mentioned that "monotonic decrease" means that the energy density in any case does not remain constant when the length of a scanline decreases. The function f(h) and the parameter a can be determined in advance by pre-tests. In particular in an "additive manufacturing" process, the effort of a limited number of pre-tests pays off as by means of the approach according to the invention the manufacturing time may be reduced particularly when many objects are manufactured in a serial production.

An inventive layer-wise additive manufacturing method for the manufacture of at least one three-dimensional object, wherein in the layer-wise additive manufacturing method the object is manufactured by applying a building material layer by layer and by solidifying the building material by a supply of radiation energy to all positions in a layer that correspond to the cross-section of the object in this layer in that these positions are scanned with energetic radiation by means of an energy input device such that the energy input device directs at least one energy beam to predetermined positions of a building material layer so that the energy beam effects a solidification of the building material, wherein the layer-wise additive manufacturing method comprises an inventive method of providing control data.

By means of the layer-wise additive manufacturing method according to the invention homogenously solidified objects may be provided within a short manufacturing time.

An inventive device for a computer-based provision of control data for a layer-wise additive manufacturing apparatus for manufacturing a three-dimensional object, wherein the object is manufactured by means of the layer-wise additive manufacturing apparatus by applying a building material layer by layer and by solidifying the building material by a supply of radiation energy to all positions in a layer that correspond to the cross-section of the object in this layer in that these positions are scanned with energetic radiation by means of an energy input device such that the energy input device directs at least one energy beam to predetermined positions of a building material layer so that the energy beam effects a solidification of the building material, comprises a provision unit that accesses a dataset that includes a data model of a number of building material layers to be selectively solidified during the manufacture, wherein in each of the layers of the data model positions corresponding to an object cross-section are marked, at which positions a solidification of the building material shall be carried out (as far as intended or existing in this layer), wherein in the dataset in at least one layer, preferably all layers, of the data model it is specified at least for a partial region of an object cross section in which chronological order an energy beam is to be moved in, preferably parallel, scan lines across the positions of this partial region for a scanning of the building material.

The device is characterised by a dataset modification unit that is configured to modify a dataset such that in at least one layer, preferably all layers, of the data model for the respective partial region of an object cross section it is checked whether the scanning time needed for the scanning of the building material along a scan line falls below a predetermined minimum length of time $t_{min}$ and if this is detected for a scan line, a reduced energy density of the energy beam during the scanning of the building material along this scan line is specified and/or after the scanning along the scan line a waiting time is specified before the energy beam is moved along a further scan line, wherein the reduced energy density of the energy beam is specified such that the more the predetermined minimum length of time $t_{min}$ is underrun, the lower the energy density of the energy beam that is specified, and a control dataset provision unit that is configured to provide the dataset that was modified by the dataset modification unit for the generation of a control dataset for the layer-wise additive manufacturing apparatus.

The provision of the dataset that has been modified in the second step for the generation of a control dataset may also be an integration of the modified dataset into a control dataset for the layer-wise additive manufacturing apparatus by the control dataset provision unit itself. However, a provision also includes a transfer of the dataset to a data processing device that integrates the dataset into a control set or a direct transfer to a layer-wise additive manufacturing apparatus. In particular, it is possible to dynamically provide the layer-wise additive manufacturing apparatus during a manufacturing process in the layer-wise additive manufacturing apparatus with datasets of object cross-sections that are still to be manufactured.

Preferably, the inventive layer-wise additive manufacturing apparatus may comprise a minimum length of time receiving unit that is configured to receive the minimum length of time train from a memory, via a network or from a user input. Due to the presence of a minimum length of time receiving unit, it is possible to specify or change the minimum length of time for the scanning of a scan line in a simple way.

An inventive layer-wise additive manufacturing apparatus for the manufacture of at least one three-dimensional object, wherein in the layer-wise additive manufacturing apparatus the object is manufactured by applying a building material layer by layer and by solidifying the building material by a supply of radiation energy to all positions in a layer that correspond to the cross-section of the object in this layer in that these positions are scanned with energetic radiation by means of an energy input device such that the energy input device directs at least one energy beam to predetermined positions of a building material layer so that the energy beam effects a solidification of the building material, wherein the layer-wise additive manufacturing apparatus comprises an inventive device for a computer-based provision of control data.

An inventive computer program has program code means in order to perform all steps of an inventive method of providing control data when the computer program is executed by a data processor, in particular a data processor interacting with a layer-wise additive manufacturing apparatus.

"Interacting" here means that the data processor either is integrated in the layer-wise additive manufacturing apparatus or is able to exchange data with it. The implementation of the inventive method of providing control data and of the corresponding device by means of software enables a simple installation on different data processing systems at different places (for example at the creator of the design of the object or at the operator of the layer-wise additive manufacturing apparatus).

The inventive computer program is stored on an inventive computer-readable storage medium. In particular, the storage medium can also be a memory in a layer-wise additive manufacturing apparatus or in the energy input device.

BRIEF DESCRIPTION OF THE DRAWINGS

Further features and expediences of the invention result from the description of exemplary embodiments by means of the attached drawings.

DETAILED DESCRIPTION OF THE EMBODIMENTS

Figure 1:
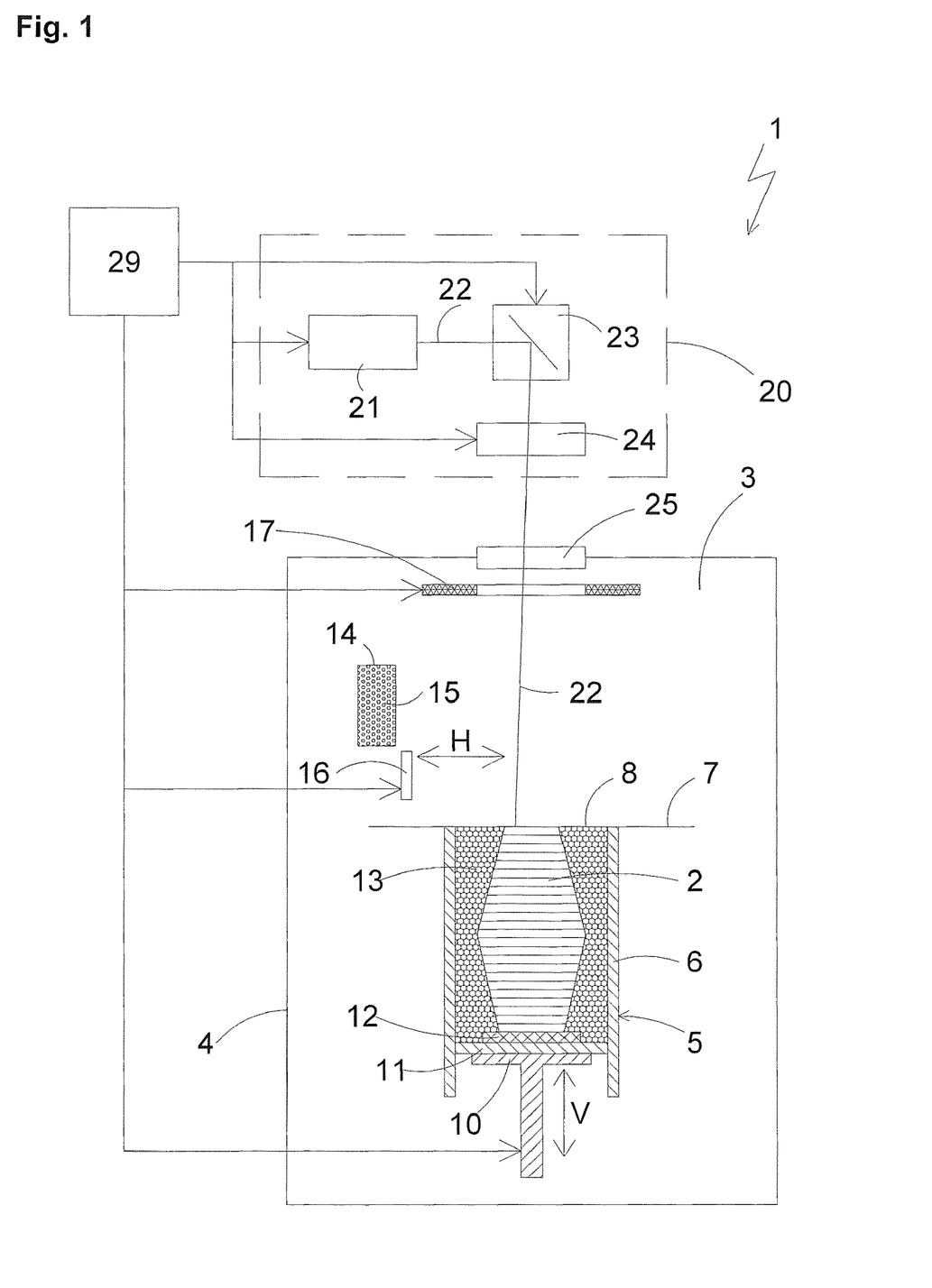
FIG. 1 shows a schematic, partially sectional view of an exemplary device for an additive manufacturing of a three-dimensional object according to an embodiment of the invention.

In the following, at first a layer-wise additive manufacturing apparatus shall be described at the example of a laser sintering device or laser melting device with reference to FIG. 1.

For building an object 2, the layer-wise building device comprises a process chamber 3 with a chamber wall 4. A container 5 open to the top with a container wall 6 is arranged in the process chamber 3. A working plane 7 is defined by the top opening of the container 5, wherein the area of the working plane 7 located within the opening, which area can be used for building the object 2, is referred to as build area 8.

In the container 5, a support 10 is arranged that can be moved in a vertical direction V and to which a base plate 11 is attached which seals the container 5 at the bottom and thus forms the bottom thereof. The base plate 11 can be formed as a plate separately from the support 10 which plate is fixed to the support 10, or it can be integrally formed with the support 10. Depending on the powder and process used, a building platform 12 as building support can be additionally arranged on the base plate 11, on which building support the object 2 is built. However, the object 2 can also be built on the base plate 11 itself, which then serves as a building support. In FIG. 1, the object 2 to be formed in the container 5 on the building platform 12 is shown below the working plane 7 in an intermediate state with several solidified layers, surrounded by building material 13 that remained unsolidified.

The laser sintering or melting device 1 further comprises a storage container 14 for a building material 15, in this example a powder that can be solidified by electromagnetic radiation, and a recoater 16 that can be moved in a horizontal direction H for applying building material 15 within the build area 8. Optionally, a heating device, e.g. a radiant heater 17, can be arranged in the process chamber 3, which heating device serves for a heating of the applied building material 15. For example, an infrared heater may be provided as radiant heater 17.

The exemplary layer-wise additive manufacturing apparatus 1 further comprises an exposure device 20 having a laser 21 generating a laser beam 22 that is deflected by a deflection device 23 and focused by a focusing device 24 on the working plane 7 through a coupling window 25 that is arranged at the top side of the process chamber 3 in the chamber wall 4.

Furthermore, the laser sintering device 1 comprises a control unit 29 by which the individual components of the device 1 can be controlled in a coordinated manner in order to implement the building process. Alternatively, the control unit can also be arranged partially or completely outside of the device. The control unit can comprise a CPU, the operation of which is controlled by a computer program (software). The computer program can be stored separately from the device on a storage medium from which it can be loaded into the device, in particular into the control unit.

In operation, the support 10 is lowered layer by layer by the control unit 29, the recoater 16 is controlled such that a new powder layer is applied and the deflection device 23 and as the case may be also the laser 21 and/or the focusing device 24 are controlled such that a respective layer is solidified by means of the laser at the positions corresponding to the respective object by scanning these positions with the laser.

In laser sintering or laser melting an exposure device may for example comprise one or more gas or solid-state lasers or any other laser types such as laser diodes, in particular VCSEL (Vertical Cavity Surface Emitting Laser) or VECSEL (Vertical External Cavity Surface Emitting Laser) or a line of these lasers. Therefore, the specific setup of a laser sintering device or laser melting device shown in FIG. 1 is only exemplary for the present invention and may of course be modified, in particular when using a different illumination device than the one that is shown. In order to indicate that the shape of the radiation incidence region on the building material is not necessarily nearly point-shaped, but may also be two-dimensional, in the following the term "beam" is often used synonymously to "ray bundle".

All statements made in the following do not only apply to laser sintering devices or laser melting devices, but also to layer-wise additive manufacturing apparatus of a different type, in which heat energy is input into the building material in the form of radiation.

In the just-described exemplary layer-wise additive manufacturing apparatus, a manufacturing process proceeds such that the control unit 29 processes a control dataset (often also designated as control command set). In the following, the approach according to the invention is exemplarily described by making reference to FIGS. 2 to 6.

Figure 2:
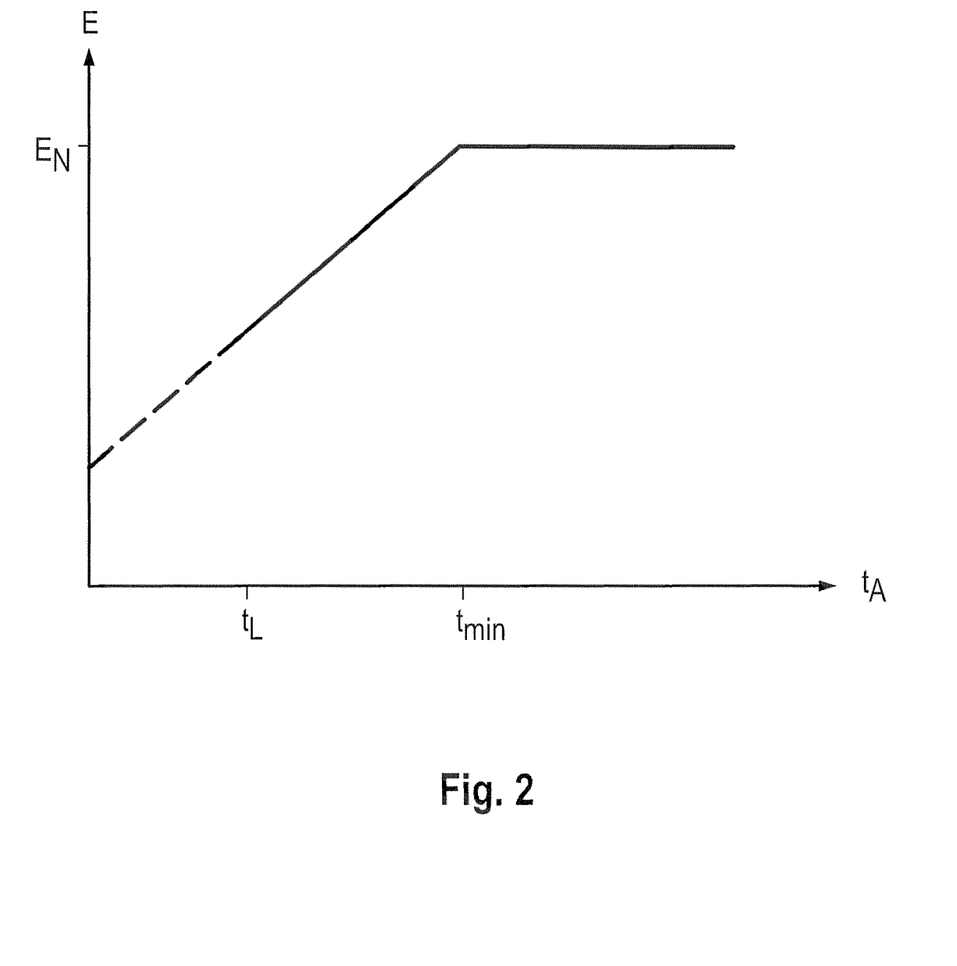
FIG. 2 schematically shows the relationship between the energy density E to be specified of an energy beam and the scanning time to for a scanline for the case that the relationship is linear.
Figure 3:
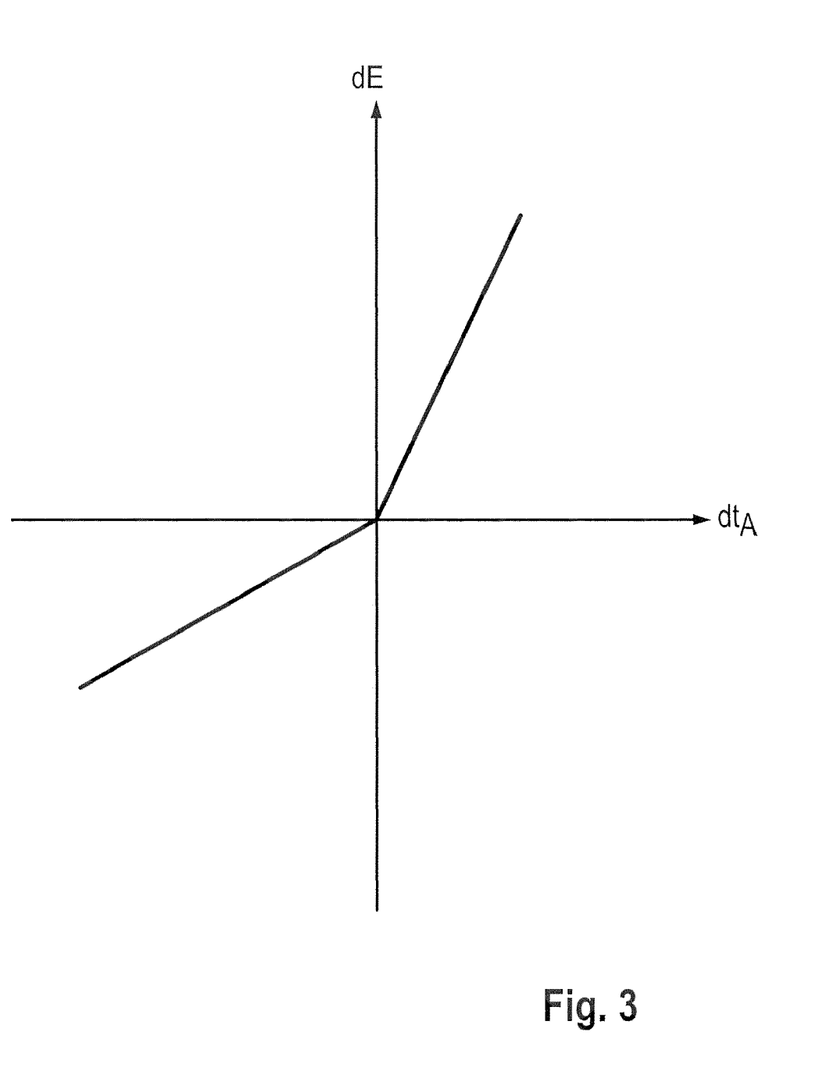
FIG. 3 shows a schematic diagram for illustrating a particular implementation of the invention.
Figure 4:
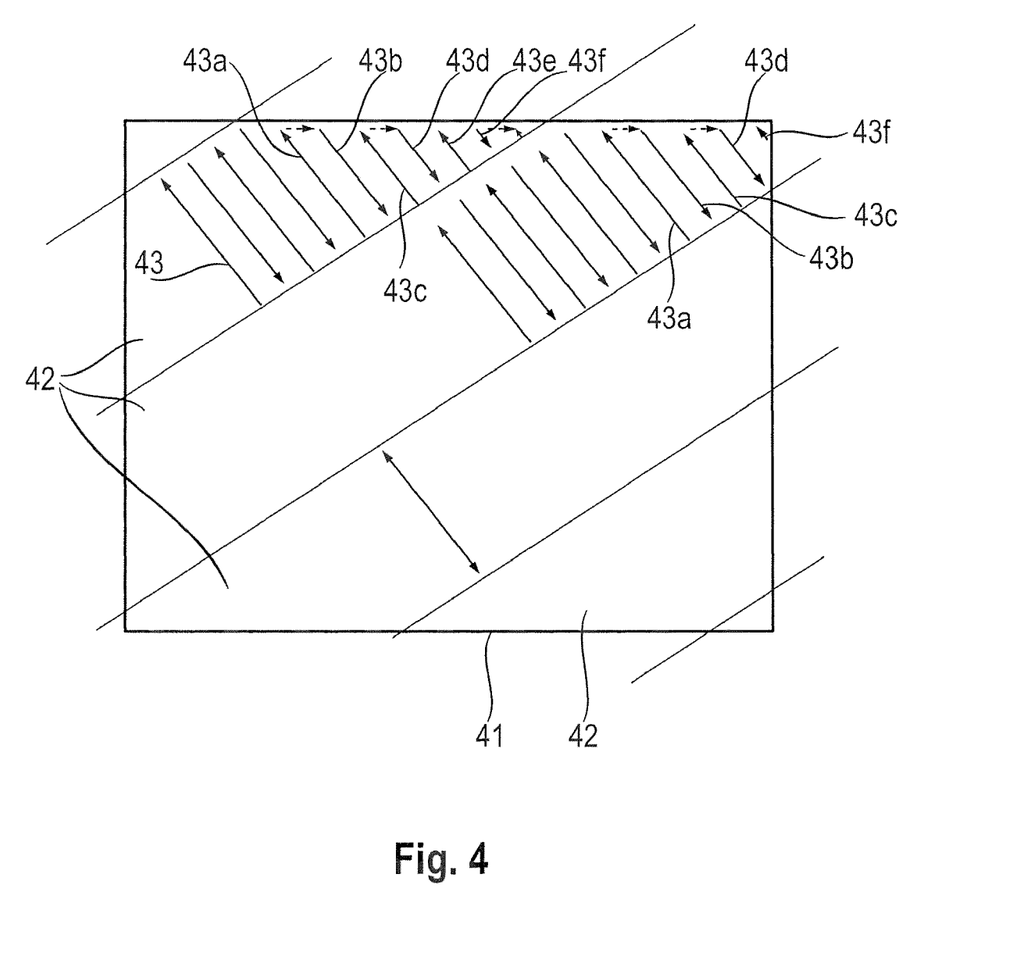
FIG. 4 shows a schematic top view onto an exemplary object cross-section in order to illustrate a particular implementation of the invention.
Figure 5:
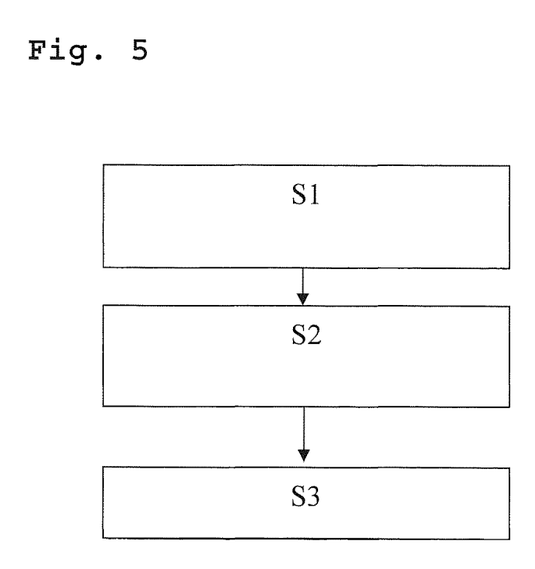
FIG. 5 illustrates the sequence of an inventive method of providing control data.
Figure 6:
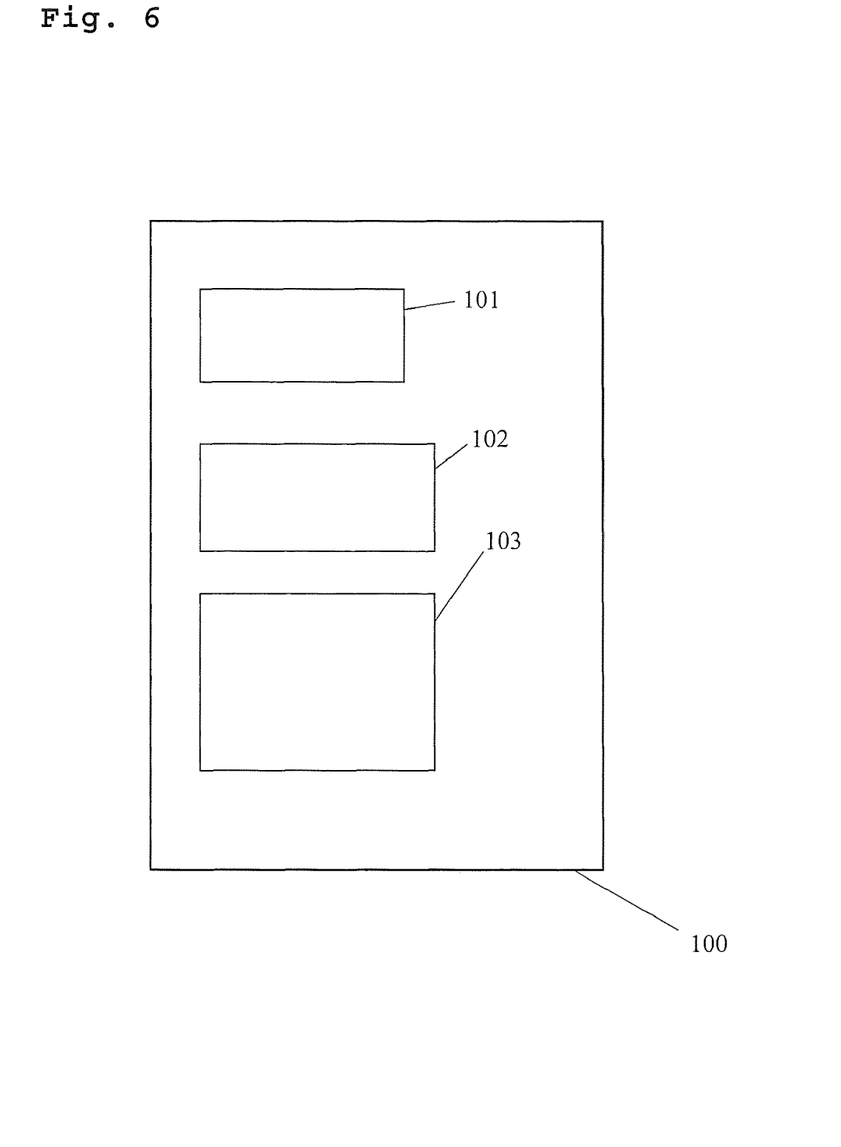
FIG. 6 shows the schematic setup of an inventive device for a provision of control data.

As shown in FIG. 6, an inventive device 100 for a provision of control data for a layer-wise additive manufacturing apparatus comprises a provision unit 101, a dataset modification unit 102 and a control dataset provision unit 103. The operating mode of the device 100 for a provision of control data will be described with reference to FIG. 5. FIGS. 2 to 4 will serve for a further illustration.

In the device 100 for a provision of control data for a layer-wise additive manufacturing apparatus that is shown in FIG. 6, at first the provision unit 101 accesses a dataset that includes a data model of a number of building material layers to be selectively solidified during the manufacture. In the process sequence shown in FIG. 5, this is step S1.

If a dataset that is accessed by the provision unit 101 does not contain any information on the chronological order in which an energy beam is to be moved in preferably parallel scanlines over the positions to be solidified of at least a partial region of an object cross-section, this information can be added to the dataset before the inventive method is carried out, for example by the inventive device 100 itself.

In a step S2 shown in FIG. 5, the dataset modification unit 102 checks at first, whether in at least one partial region of an object cross-section the predetermined minimum length of time for the scanning of a scanline is underrun. If such an underrun is detected, the dataset modification unit 102 either lowers the specified energy density of the energy beam for the scanning of the respective scanline or specifies a waiting time before or after the scanning of the respective scanline, so that the scanning time for the respective scanline and the waiting time together preferably correspond to the minimum length of time. Of course, the energy density of the energy beam can be lowered and a waiting time can be inserted as well.

FIG. 2 schematically shows the relationship between the energy density E of an energy beam that is to be specified and the scanning time $t_A$ for a scanline. It can be seen that the energy density is comparatively lower as long as the scanning time $t_A$ is below a predetermined minimum length of time $t_{min}$. As soon as the scanning time $t_A$ is larger or the same as the predetermined minimum length of time $t_{min}$, FIG. 2 shows a constant standard energy density $E_N$ for the energy beam.

It is emphasized that the linear relationship between the energy density E of the energy beam and the scanning time $t_A$ that is shown in FIG. 2 for the case that the scanning time $t_A$ is below the minimum length of time $t_{min}$, may also be a non-linear relationship as long as the energy density E decreases monotonically with the scanning time $t_A$ and is smaller than the standard energy density $E_N$. Also, for values of the scanning time $t_A$ that are larger than the minimum length of time $t_{min}$, the energy density need not necessarily assume the value of the standard energy density $E_N$. Rather, it can assume arbitrary other values above of the value of the standard energy density $E_N$.

Even if arbitrarily short scanning times for a scanline seem to be admitted by the schematic representation in FIG. 2, in practice there will often be a minimum scanning time $t_L$, below of which no scanline will be specified as due to technical boundary conditions a certain minimum scanning time cannot be underrun. Therefore, the left part of the curve is displayed as dashed line. The minimum scanning time $t_L$ depends for example on the maximum velocity of the deflection device 23.

The energy density of the energy beam can for example be effected by a lowering of the power of the laser source or electron beam source or else by a different driving of the radiation energy source, for example a modification of the laser pulse width for a pulsed laser.

In a step S3 shown in FIG. 5, finally the dataset provision unit 103 provides the dataset that was modified in step S2 for the generation of a control dataset.

In the following, modifications of the just-described approach will be described.

In a preferred modification of the invention it is differentiated, whether the scanline following in time has a smaller or larger scanning time than the preceding scanline. For this, the dataset modification unit 102 determines for two neighboring scanlines each having a scanning time underrunning the predetermined minimum length of time which of the two scanlines in the dataset shall be scanned later in time. The reason for this is that the inventors have found that for a longer scanning time for the scanline that is later in time, the energy density with respect to the scanline preceding in time should be larger than in the case, in which the scanline following in time has a smaller scanning time. The approach is schematically shown in FIG. 3.

In the diagram of FIG. 3, the abscissa represents the change $dt_A$ of the scanning time in a transition to the scanline following in time, wherein $dt_A = t_A$ (following scanline)$-t_A$ (preceding scanline) applies. The ordinate shows the change dE of the energy density in the transition to the scanline consecutive in time, where dE=E (consecutive scanline)–E (preceding scanline)

applies. It can be seen that the linear relationship between dE and $dt_A$ that is exemplarily shown for increasing scanning times (to the right of the vertical axis of the coordinate system) differs from the linear relationship for decreasing scanning times (to the left of the vertical axis of the coordinate system). From the different slopes in the first and third quadrants of the Cartesian coordinate system, it is apparent that for increasing scanning times the energy density changes to a larger degree than for decreasing scanning times. Again, the linear relationship is only exemplary.

FIG. 4 illustrates a preferred modification, in which several exposure regions are assigned to at least one partial region of an object cross-section to be solidified. FIG. 4 schematically shows an object cross-section 41 that is for example rectangular. This object cross-section is not solidified by a scanning by means of scanlines that extend over the whole width of the object cross-section. Rather, stripe-shaped (rectangular) exposure regions 42 are assigned to the object cross-section 41. In each of the exposure regions 42, the building material to be solidified within the object cross-section 41 is scanned by a scanning of neighboring scanlines 43, wherein every two neighboring scanlines are for example scanned in opposite directions. In the present example, a minimum length of time that is specified for the scanning of a scanline, is a length of time that is needed for the scanning along scanlines 43 that lie completely within the object cross-section. However, from the scanlines 43a, 43b, 43c, 43d, 43e and 43f it can be seen that the scanline length and (for the exemplary constant scan velocity or velocity v of movement of a beam along the scanlines) also the scanning time decreases, if the exposure region extends beyond the edge of the object cross-section 41. Therefore, in order to adapt the energy density of the beam to the reduced scanning times, for each of scanlines 43a to 43f a reduced energy density is specified. For example, if one assumes that the scanlines 43 are all scanned with the same standard energy density $E_N$, the energy density $0.9 \times E_N$ is specified for scanline 43a, the energy density $0.85 \times E_N$ is specified for scanline 43b, the energy density $0.8 \times E_N$ is specified for scanline 43c, the energy density $0.75 \times E_N$ is specified for scanline 43d, the energy density $0.7 \times E_N$ is specified for scanline 43e and the energy density $0.65 \times E_N$ is specified for scanline 43f.

It can also be seen in FIG. 4 that where the length of time for scanning (and usually also the scanline length) do change to a large extent, also the energy density changes to a large extent. This can be seen in particular in the upper right corner of the object cross-section 41, where the scanlines 43d and 43f lie immediately side by side and an energy density of $0.75 \times E_N$ is specified for the scanline 43d and an energy density of $0.65 \times E_N$ is specified for the scanline 43f.

In order to make a specification of the energy density to be input before the manufacturing of an object easier, it makes sense to set up an equation for the energy density to be input. Here, as example for such an equation the equation $E_{reduc} = E_0 - (1 - f(h) \cdot h/w) \cdot a \cdot E_0$ is given, wherein $E_0$ is the mean energy density of the energy beam at positions of the partial region at which the minimum length of time $t_{min}$ is not underrun when scanning along the scan lines, wherein h is the length of a scan line in a partial region, wherein f(h) is a function describing the monotonic decrease of the energy density with decreasing length of a scan line, wherein w is the size of the exposure region in the direction of the scan lines and wherein a describes the maximum amount by which the energy density of the energy beam shall be decreased. The function f(h) can e.g. be a linear function. Finally, it shall be mentioned that an inventive device 100 for a provision of control data for a layer-wise additive manufacturing apparatus can be implemented not only by software components but also exclusively by hardware components or mixtures of hardware and software. In particular, interfaces that are mentioned in the present application need not necessarily be formed from hardware components, but can also be implemented as software modules, for example if the data that are input or output via these interfaces can be taken over from other components that are implemented in the same device or need to be transferred to another component only by software. Also, the interfaces could consist of hardware components and software components, such as a standard hardware interface that is specifically configured by software for a specific application. Furthermore, a plurality of interfaces can be combined into a common interface such as an input-output interface.

What is claimed:

1. A layer-wise additive manufacturing method for the manufacture of at least one three-dimensional object, wherein in the layer-wise additive manufacturing method the object is manufactured by applying a building material layer by layer and by solidifying the building material by a supply of radiation energy to all positions in a layer that correspond to the cross-section of the object in this layer in that these positions are scanned with energetic radiation by means of an energy input device such that the energy input device directs at least one energy beam to predetermined positions of a building material layer so that the energy beam effects a solidification of the building material, wherein the layer-wise additive manufacturing method comprises:

a computer-based method of providing control data for a layer-wise additive manufacturing apparatus for manufacturing a three-dimensional object, wherein the object is manufactured by means of the layer-wise additive manufacturing apparatus by applying a building material layer by layer and by solidifying the building material by a supply of radiation energy to all positions in a layer that correspond to the cross-section of the object in this layer in that these positions are scanned with energetic radiation by means of an energy input device such that the energy input device directs at least one energy beam to predetermined positions of a building material layer so that the energy beam effects a solidification of the building material, said method of generating a control dataset comprising a first step of accessing a dataset that includes a data model of a number of building material layers to be selectively solidified during the manufacture, wherein in each of the layers of the data model positions corresponding to an object cross-section are marked, at which positions a solidification of the building material shall be carried out, wherein in the dataset in at least one layer of the data model it is specified at least for a partial region of an object cross section in which chronological order an energy beam is to be moved in scan lines across the positions of this partial region for a scanning of the building material, characterised in that in a second step the dataset is modified such that in at least one layer of the data model for the respective partial region of an object cross section it is checked whether the scanning time needed for the scanning of the building material along a scan line falls below a predetermined minimum length of time tmin and if this is detected for a scan line, a reduced energy density of the energy beam during the scanning of the building material along this scan line is specified and/or after the scanning along the scan line a waiting time is specified before the energy beam is moved along a further scan line, wherein the reduced energy density of the energy beam is specified such that the more the predetermined minimum length of time tmin is underrun, the lower the energy density of the energy beam that is specified, and in a third step the dataset that was modified in the second step is provided for the generation of a control dataset for the layer-wise additive manufacturing apparatus.

2. The method of claim 1, wherein in the second step it is checked, whether for two scan lines lying next to each other the predetermined minimum length of time tmin is underrun by a different amount and if this is the case it is checked which of the two scan lines is to be scanned later in time, wherein a first reduced energy density is specified for the scan line to be scanned first and a second reduced energy density is specified for the scan line to be scanned later in time, wherein the first and second reduced energy densities are specified such that for the case that a scanning time for the scan line to be scanned later in time is smaller than a scanning time for the scan line to be scanned first the absolute value of the difference between the first and second reduced energy densities is smaller than in the case in which a scanning time for the scan line to be scanned later in time is larger than a scanning time for the scan line to be scanned first.

3. The method of claim 1, wherein the provided dataset includes a plurality of partial regions of a cross section in a layer, which partial regions are located above unsolidified material in the preceding layer or below material in the following layer that is not to be solidified.

4. The method of claim 1, wherein for the case that an underrun of the minimum length of time tmin is detected for a scan line, a waiting time is inserted before or after the scanning of the building material along this scan line, wherein the waiting time corresponds at most, to the difference between the minimum length of time tmin and the length of time for the scanning of this scan line.

5. The method of claim 1, wherein n exposure regions are assigned to the at least one partial region, wherein n is a natural number, an exposure region being a rectangular or quadratic area element that partially overlaps the partial region, wherein in an exposure region an energy beam is moved across the building material in the partial region in scan lines, when the building material is scanned with energetic radiation.

6. The method of claim 5, wherein for the case that for a scan line an underrun of the minimum length of time tmin is detected, a waiting time before or after the scanning of the building material along this scan line is specified and a scanning of the building material by the energy beam along at least one further scan line is specified for the waiting time.

7. The method of claim 5, wherein the minimum length of time tmin is set to the quotient of the extent of the exposure region in a direction which is in parallel to the scan lines and the mean velocity of movement of the energy beam along a scan line in the exposure region, so that an underrun of the minimum length of time tmin is indicated by the length of a scan line being smaller than the extent of the exposure region in a direction which is in parallel to the scan lines.

8. The method of claim 7, wherein the reduced energy density of the energy beam (Ereduc) along a scan line is defined according to the equation $$E_{reduc} = E0(1 - f(h) * h/w) * a * E0,$$

wherein E0 is the mean energy density of the energy beam at positions of the partial region at which the minimum length of time tmin is not underrun when scanning along the scan lines, wherein h is the length of a scan line in a partial region, wherein f(h) is a function describing the monotonic decrease of the energy density with decreasing length of a scan line, wherein w is the size of the exposure region in the direction of the scan lines and wherein a describes the maximum amount by which the energy density of the energy beam shall be decreased.

9. The method of claim 1, further comprising:

providing a provision unit that accesses a dataset that includes a data model of a number of building material layers to be selectively solidified during the manufacture, wherein in each of the layers of the data model positions corresponding to an object cross-section are marked, at which positions a solidification of the building material shall be carried out, wherein in the dataset in at least one layer of the data model it is specified at least for a partial region of an object cross section in which chronological order an energy beam is to be moved in scan lines across the positions of this partial region for a scanning of the building material, and a dataset modification unit that is configured to modify a dataset such that in at least one layer of the data model for the respective partial region of an object cross section it is checked whether the scanning time needed for the scanning of the building material along a scan line falls below a predetermined minimum length of time tmin and if this is detected for a scan line, a reduced energy density of the energy beam during the scanning of the building material along this scan line is specified and/or after the scanning along the scan line a waiting time is specified before the energy beam is moved along a further scan line, wherein the reduced energy density of the energy beam is specified such that the more the predetermined minimum length of time tmin is underrun, the lower the energy density of the energy beam that is specified, and a control dataset provision unit that is configured to provide the dataset that was modified by the dataset modification unit for the generation of a control dataset for the layer-wise additive manufacturing apparatus.

10. The method of claim 9, further including a minimum length of time receiving unit that is configured to receive the minimum length of time tmin from a memory, via a network or from a user input.

* * * * *